(12) United States Patent
Caia

(10) Patent No.: US 7,352,777 B2
(45) Date of Patent: Apr. 1, 2008

(54) DATA FRAMER

(75) Inventor: Jean-Michel Caia, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 1072 days.

(21) Appl. No.: 10/071,263

(22) Filed: Feb. 7, 2002

(65) Prior Publication Data

US 2003/0091041 A1 May 15, 2003

Related U.S. Application Data

(60) Provisional application No. 60/336,291, filed on Oct. 31, 2001.

(51) Int. Cl.
*H04J 3/06* (2006.01)

(52) U.S. Cl. .................................. 370/503; 370/242

(58) Field of Classification Search ........ 370/229–235, 370/351–370, 395.51
See application file for complete search history.

(56) References Cited

U.S. PATENT DOCUMENTS

| | | | | |
|---|---|---|---|---|
| 3,940,563 A | * | 2/1976 | Susset | 370/509 |
| 3,985,967 A | * | 10/1976 | Colton et al. | 370/510 |
| 4,788,681 A | * | 11/1988 | Thomas et al. | 370/509 |
| 5,040,195 A | * | 8/1991 | Kosaka et al. | 375/365 |
| 5,210,754 A | | 5/1993 | Takahashi et al. | |
| 5,400,369 A | * | 3/1995 | Ikemura | 375/368 |
| 6,260,167 B1 | | 7/2001 | Lo et al. | |
| 6,674,755 B1 | | 1/2004 | Potter et al. | |
| 6,876,630 B1 | * | 4/2005 | Shim | 370/242 |
| 2001/0008550 A1 | * | 7/2001 | Takahashi | 375/368 |
| 2002/0064181 A1 | * | 5/2002 | Ofek et al. | 370/477 |
| 2003/0227943 A1 | * | 12/2003 | Hallman et al. | 370/503 |

OTHER PUBLICATIONS

ETSI EN 300 417-1-1 (V1.2.1) Jun. 2001 (SDH).
ITU-T G707 Nov. 2000 (SDH).
Applied Micro Circuits Corporation, "S4801 Amazon Device Specification", pp. 56-57, Jul. 2000.
Intel, "IXF6048, 51/155/622/2488 Mbit/s SONET/SDH Cell/Packet Interface Datasheet", pp. 111-115, Oct. 2001.
International Telecommunication Union, "ITU-T G.709. Series G: Transmission Systems and Media, Digital Systems and Networks", pp. 1-131 (2001).
Level One Communications, Inc., "SXT 6051 (New Mexico) Data Sheet/Product Specification", pp. 34-38, Jul. 1996.
Characteristics of Synchronous Digital Hierarchy (SDH) Equipment Functional Blocks, International Telecommunication Union, 299 pages, ITU-T G-783 (Oct. 2000).
Synchronous Optical Network (SONET)—Data Communication Channel Protocols and Architectures, American National Standard, 26 pages; ANSI T1.105.04-1995 (R2001).
Synchronous Optical Network (SONET) Transport Systems: Common Generic Criteria, Bellcore, 786 pages; GR-253 (Jan. 1999).

* cited by examiner

*Primary Examiner*—Chi Pham
*Assistant Examiner*—Phuc Tran
(74) *Attorney, Agent, or Firm*—Fish & Richardson P.C.

(57) ABSTRACT

Frames of data comprised of frameword bytes and a payload are processed by identifying a start of a first frame and a phase of the first frame concurrently based on the frameword bytes, and aligning data in a second frame, based on the phase of the first frame, to make a start of the second frame coincide with a start of a byte boundary.

37 Claims, 8 Drawing Sheets

DATA FRAMER

CROSS-REFERENCE TO RELATED APPLICATION

This application claims priority to U.S. Provisional Application No. 60/336,291, filed on Oct. 31, 2001 and entitled "Multi-rate SONET/SDH Frame and Word Alignment".

TECHNICAL FIELD

This invention relates to a data framer that recovers frames of data from a data stream.

BACKGROUND

Transmission protocols, such as SONET (Synchronous Optical Networking) and SDH (Synchronous Digital Hierarchy), transmit data in structured frames. The SONET/SDH frame structure includes frameword bytes 10, 11 and payload bytes 14, as shown in FIG. 1. The frameword bytes contain N×A1 bytes (A1 typically has a value of $F6_H$) and N×A2 bytes (A2 typically has a value of $28_H$), where N is an integer that depends on the data transmission rate (N=1, 3, 12, 48, etc.) and subscript "H" stands for hexadecimal (also referred to as "HEX"). Frameword bytes are used to delineate a frame and payload bytes carry the data transmitted in that frame.

Data frames are transmitted over an optical network in a serial data stream. A de-serializer device is required at the termination of the optical network in order to convert the serial data stream to parallel data. The conversion, however, can change the byte alignment (phase) of the frames. As a result, the frame and byte boundaries of the converted data are unknown. A data framer may be used at the recipient end of the optical network to restructure the frame and thereby correct any misalignment (i.e., phase errors).

DESCRIPTION

Figure 1:
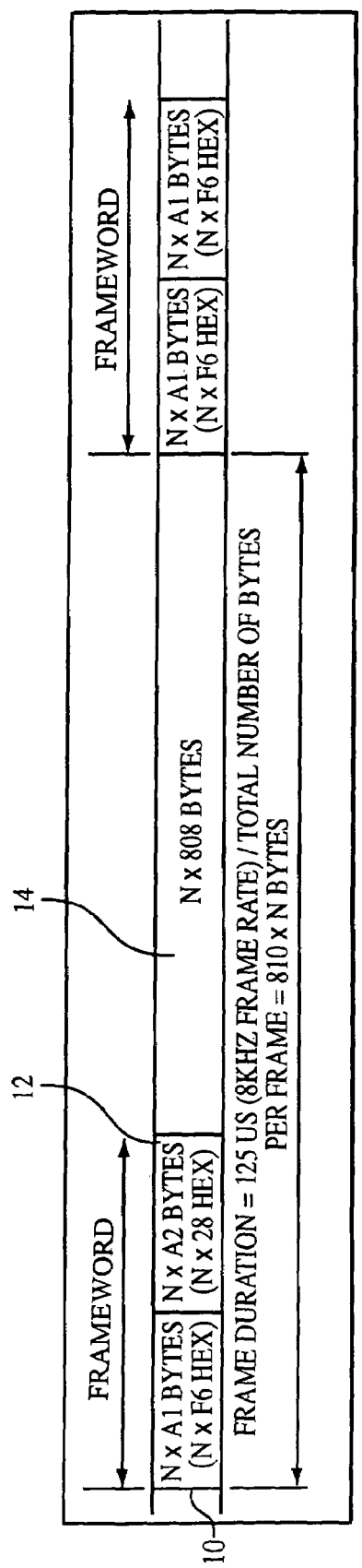
FIG. 1 is a block diagram of a SONET/SDH data frame.
Figure 2:
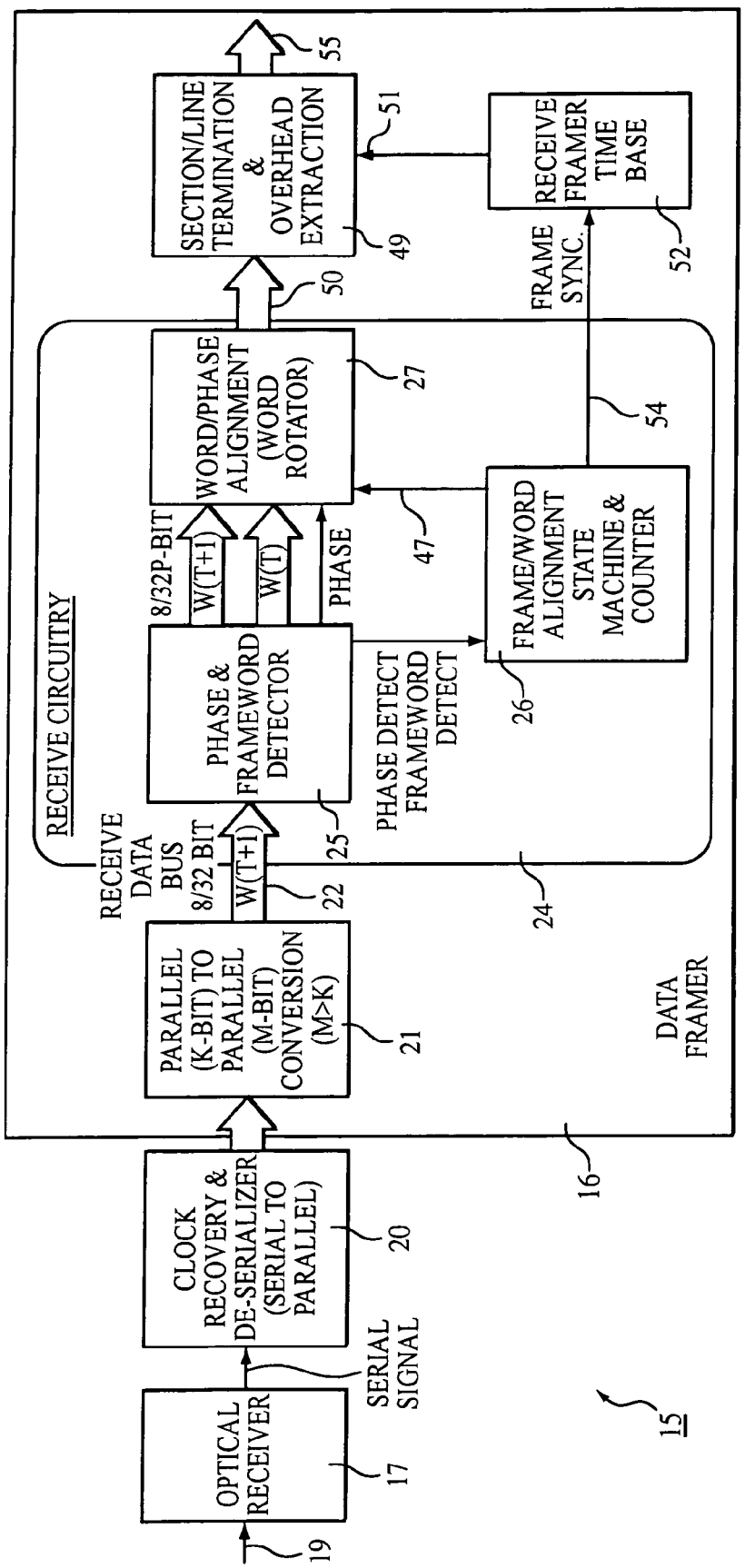
FIG. 2 is a block diagram of a receiver portion of an optical network, which includes a data framer for identifying and recovering frames transmitted over the optical network.

Referring to FIG. 2, elements of a receiver at the termination of an optical transmission network 15 are shown, including data framer 16. Optical transmission network 15 includes an optical receiver 17. Optical receiver 17 is connected to an optical transmission medium 19, such as fiber optic cable, from which receiver 17 receives SONET/SDH data frames. Optical receiver 17 receives the data as optical signals and converts the optical signals into serial electrical data, which is transmitted to clock recovery and de-serializer circuit 20.

Clock recovery and de-serializer circuit 20 receives the serial data stream from optical receiver 17. The serial data stream is typically received at a relatively high rate. Clock recovery and de-serializer circuit 20 converts the serial data stream into a parallel data stream that is transmitted at an intermediate rate (which is lower than the high rate), such as 622.08 megabits-per-second (Mb/s) for a 16-bit parallel data stream for a 10 gigabit transmission line. The values of the high rate and the intermediate rate may vary based on characteristics of the optical network and data framer.

Clock recovery and de-serializer circuit 20 transmits the intermediate-rate parallel data to framer 16. Framer 16 includes a parallel-to-parallel converter 21 that converts the intermediate-rate parallel data to low-rate (e.g., 38.88 Mb/s, 19.44 Mb/s, etc.) parallel data. Parallel-to-parallel converter 21 transmits the low-rate parallel data over a receive data bus 22 (which may be, e.g., an 8/32P-bit bus, where P≧1) to receive circuitry 24.

Figure 3:
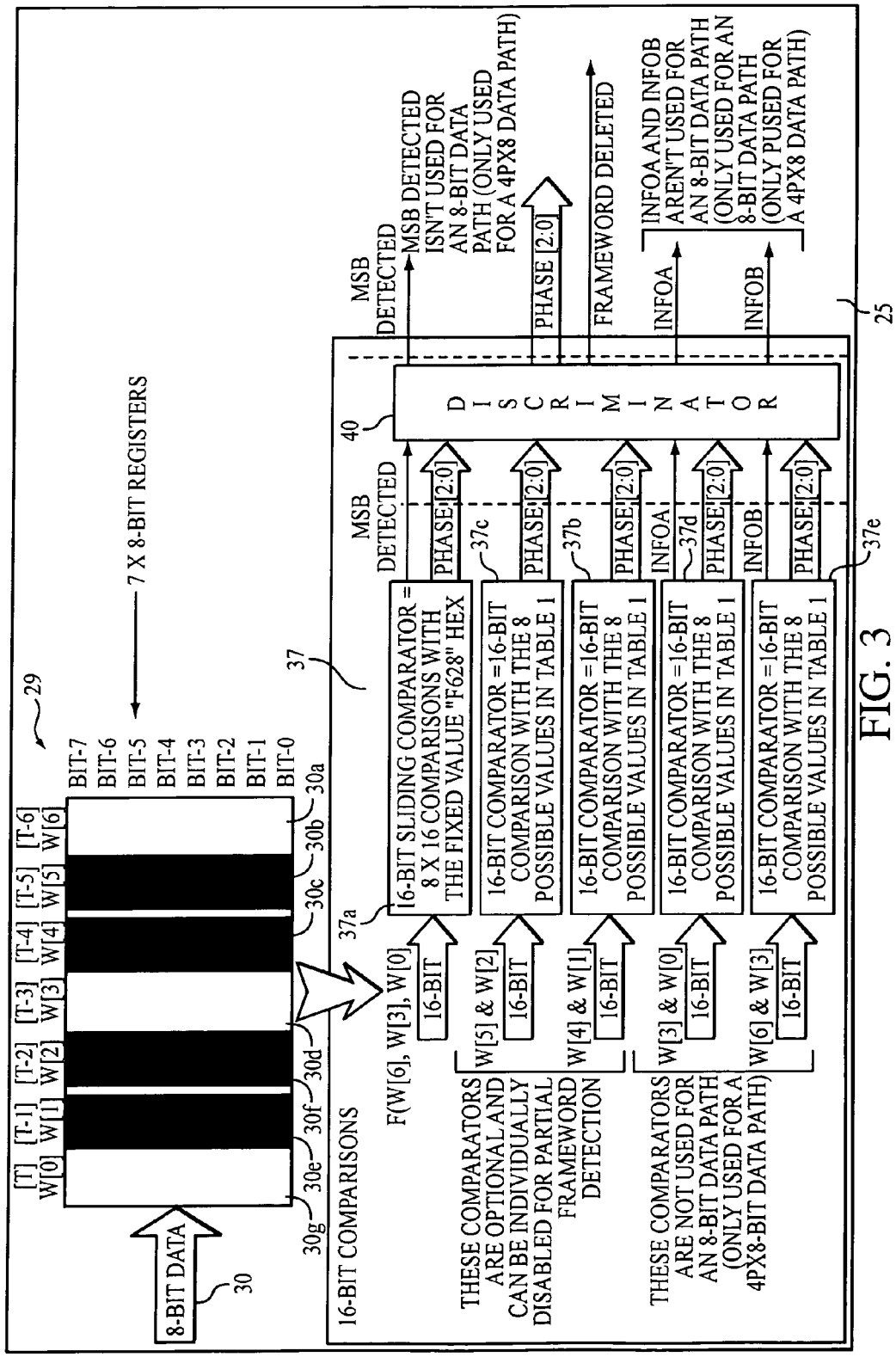
FIG. 3 is a block diagram of a phase and frameword detector included in the data framer of FIG. 2.

Receive circuitry 24 includes a phase and frameword detector ("detector") 25, a frame/word alignment state machine and counter ("state machine") 26, and a word/phase alignment rotator ("word rotator") 27. Detector 25 receives the low-rate parallel data from receive data bus 22 and identifies a start of a SONET/SDH frame and a phase of that frame concurrently based on frameword bytes in the frame. In more detail, detector 25 contains N (N≧2) registers which receive data for a frame and which store the data. FIG. 3 shows an example of detector 25, which includes seven parallel registers 29, each for storing 8-bit parallel data. Detector 25 receives the 8-bit parallel data (e.g., a data word) 30 from receive data bus 22 and stores successive blocks of 8-bit parallel data in the registers. In this embodiment, the first 8 bits are stored in register 30a, the second 8 bits are stored in register 30b, and so on until registers 30a to 30g contain data.

Figure 4:
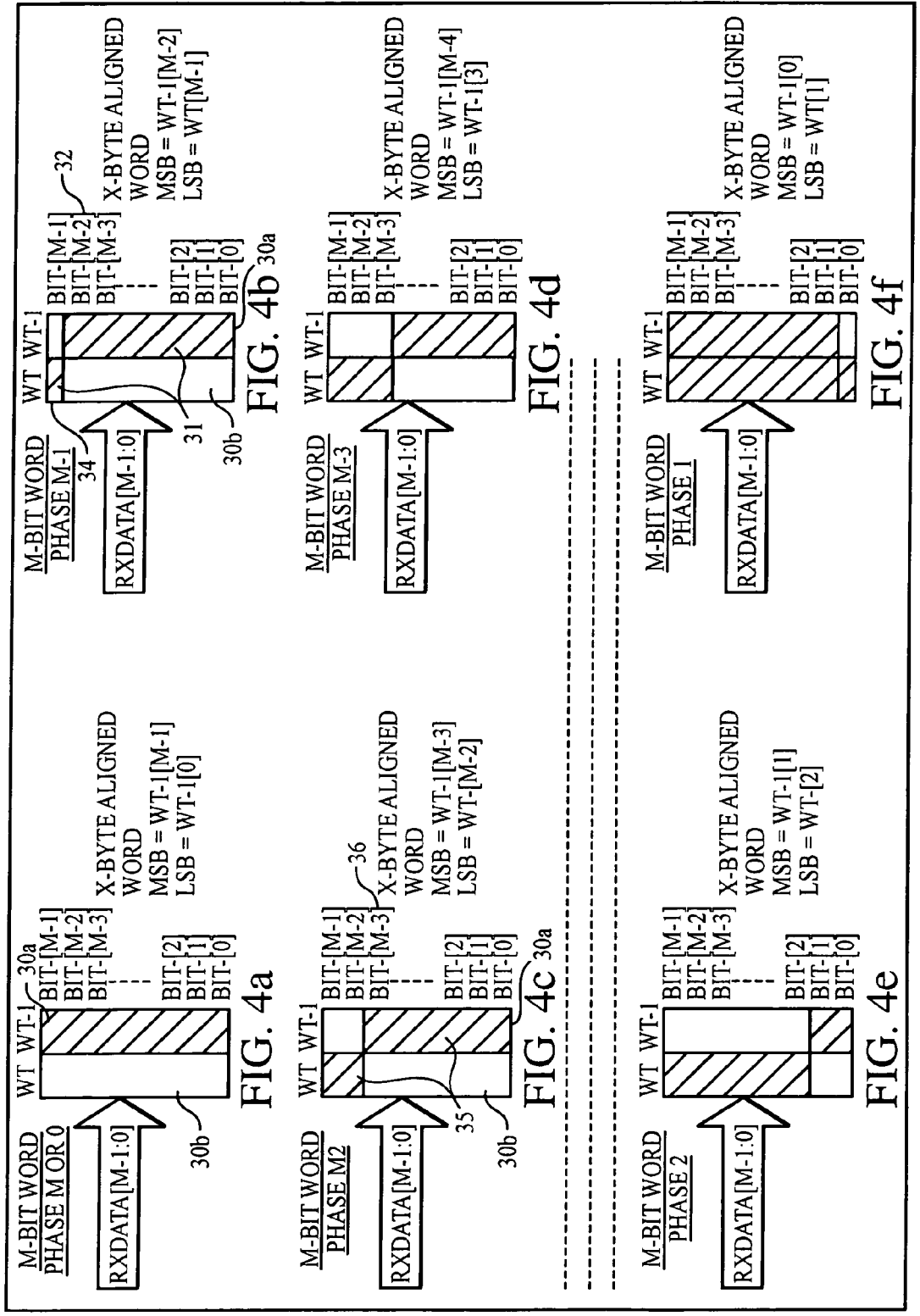
FIG. 4, comprised of FIGS. 4a, 4b, 4c, 4d, 4e and 4f, includes block diagrams showing data misalignment following serial-to-parallel conversion.

The data may be misaligned in the registers, meaning that an 8-bit word may be split between two registers. Referring to FIG. 4, the data may be misaligned in a number of ways. FIG. 4a shows a case where the data is not misaligned, i.e., the first 8 bits are in register 30a and the second 8 bits are in register 30b. FIG. 4b shows the case where the data is misaligned by one bit, i.e., the most significant bit (MSB) of an 8-bit word 31 is bit 32 in register 30a and the least significant bit (LSB) of the 8-bit word is bit 34 in register 30b. FIG. 4c shows the case where the data is misaligned by two bits, i.e., the MSB of an 8-bit word 35 is bit 36 in register 30a and the LSB of the 8-bit word is in register 30b. FIG. 4d shows the case where the data is misaligned by 3 bits; FIG. 4e shows the case where the data is misaligned by 6 bits; and FIG. 4f shows the case where the data is misaligned by 7 bits. Other cases (e.g., 5-bit misalignment) are not shown.

Detector 25 contains comparators 37 (FIG. 3) for comparing the data in the registers to predetermined values that correspond to the frameword bytes of a SONET/SDH data frame. In this embodiment, the comparators sequentially compare the data in the registers to predetermined values. In this embodiment, the registers are a 7×8-bit words buffer (W{6:0}{7:0}) that is used to detect an F6-F6-F6-28-28-28 (HEX) frame pattern, which comprises the last three A1 bytes of a frameword followed by the first three A2 bytes. The comparators include a 16-bit sliding comparator 37a made up of 8×16-bit comparators. The sliding comparator identifies the start of a frame and its phase by locating the frameword bytes. In more detail, the 8×16-bit comparators are used to detect the A1/A2 bytes out of the data in registers 30a, 30d and 30g, i.e., the W(0), W(3) and W(6) words, which correspond to the A1(N-2), A(N), A2(1) and A2(3) framewords. A subset of the registers that contain the first and last bits of a frameword is thus selected for comparison. However, all registers may be compared, as described in more detail below.

The comparison identifies the framewords of a SONET/SDH frame and the phase of those framewords. In this context, the phase is identified based on a location of the start of the frameword bytes (and thus, the start of the frame) in the registers. That is, ideally, each successive 8-bit frameword should fit into successive registers 30a to 30g (e.g., as shown in FIG. 3). However, when the frame is out-of-phase, a part of one frameword byte will be stored in one register and the remainder of that same frameword byte will be stored in another register, as shown, e.g., in FIGS. 4b to 4f. To determine the phase, therefore, detector 25 determines the location of the first bit of a frameword in a register.

By way of example, the A1/A1 frameword boundary is defined by a HEX value of F6 followed by a HEX value of 28. Therefore, in this example, to detect the A1/A1 frameword boundary, it is necessary to detect a HEX value of F6 followed by a HEX value of 28. In mathematical notation:

$$\text{PHASE } i = \{1{:}7\} \text{ if } F628_H$$
$$= A1(N-2)\{7{:}1\} \ \& \ A1(N)\{i-1{:}0\} \ \&$$
$$A2(1)\{7{:}i\} \ \& \ A2(3)\{i-1{:}0\}$$
$$= W(6)\{i-1{:}0\} \ \& \ W(3)\{7{:}0\} \ \& \ W(0)\{7{:}1\}$$

$$\text{PHASE 8 or 0 if } F628_H = A1(N)\{7{:}0\} \ \& \ A2(3)\{7{:}0\}$$
$$= W(6)\{7{:}0\} \ \& \ W(3)\{7{:}0\}.$$

In the foregoing, "Phase(i={1:7})" means that the phase is between 1 and 7—the value of "i", the values of A1 and A2 comprise frameword bytes in a SONET/SDH frame, and the values of W correspond to words in registers 30a to 30g.

Once the sliding comparator has detected the A1/A2 framing pattern and the phase over 16 non-consecutive bits, the rest of the data in registers 30f, 30e, 30c, and 30b (corresponding to words W(1), W(2), W(4) and W(5)), respectively, may be checked to determine if that data corroborates the detected frameword and phase. The additional comparisons are as follows:

PHASE i={1:8} if
  W(4){7:0} & W(1){7:0}=W(5){7:0} & W(2){7:0}=VALUE(i), where the set of predefined values for VALUE(i), in HEX, is shown in Table 1 below for each phase, i.e., PHASE(i):

TABLE 1

| PHASE (i) | VALUE (i) |
|---|---|
| 1 | DB-A0 |
| 2 | ED-50 |
| 3 | B7-41 |
| 4 | 6F-82 |
| 5 | DE-05 |

TABLE 1-continued

| PHASE (i) | VALUE (i) |
|---|---|
| 6 | BD-0A |
| 7 | 7B-14 |
| 8 or 0 | F6-28 |

For example, if the values of
  W(4){7:0} & W(1){7:0}=W(5){7:0} & W(2){7:0} 7B & 14, then the data has a phase of "7".

Detector 25 is programmable to change the amount of data to compare. For example, referring to FIG. 3, 16-bit (2 byte) detection is performed using a sliding comparator 37a over registers 30g (word W(0)), 30d (word W(3)), and 30a (word W(6)). A 32-bit (4-byte) detection is performed using sliding comparator 37a over registers 30g (word W(0)), 30d (word W(3)), and 30a (word W(6)) and using a fixed comparator 37b or 37c to compare values in registers 30c (word W(4)) and 30f (word W(1)), or to compare values in registers 30b (word W(5)) and 30e (word W(2)). A 48-bit (6 byte) detection is performed using sliding comparator 37a over registers 30g (word W(0)), 30d (word W(3)), and 30a (word W(6)) and using two fixed comparators—comparator 37b to compare values in registers 30c (word W(4)) and 30f (word W(1)), and comparator 37c to compare values in registers 30b (word W(5)) and 30e (word W(2)). Additional fixed comparators 37d and 37e may be used to compare the values in registers 30g (word W(0)) and 30d (word W(3)), and to compare the values in registers 30d (word W(3)) and 30a (word W(6)) with values in Table 1 above.

Discriminator 40 is programmable to select the phase output(s) of one or more of comparators 37a to 37e to provide to state machine 26 (FIG. 2). For example, if 16-bit detection is being performed, discriminator 40 selects and outputs only the phase output of sliding comparator 37a.

If discriminator 40 is programmed to select more than one phase output, discriminator 40 may also be programmed to ensure that the phase information coming from comparators 37a to 37e is coherent, i.e., that the same phase information is coming from each comparator. If discriminator 40 determines that the phase information is not coherent, discriminator 40 may select the phase information coming, e.g., from a majority of the comparators, wait until the phase information is coherent, or wait for another contingency.

State machine 26 (FIG. 2) identifies a predetermined number of frames following identifying the start of a first frame and a phase of the first frame. This is done to ensure that the framewords are being received in synchronism. In this embodiment, state machine 26 (shown in FIG. 5) uses both a frameword detection indication and the phase output by detector 25. State machine 26 uses the frameword detection indication and the phase to synchronize both the receive frame time base (performed in detector 25) and to initiate the word phase alignment (performed in word rotator 27).

Figure 5:
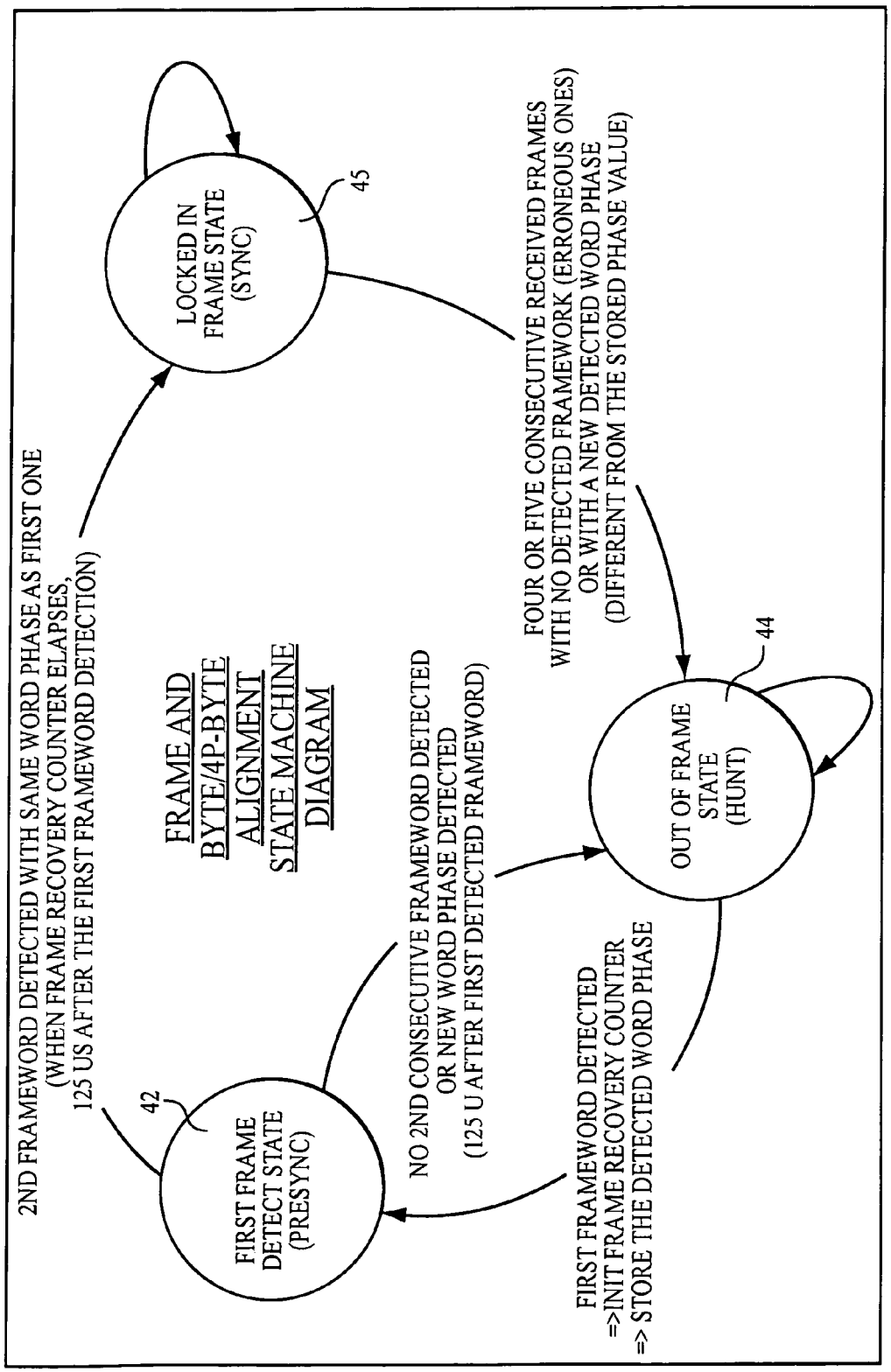
FIG. 5 is a state machine included within the data framer of FIG. 2.

Referring to FIG. 5, in state 42, a first frame is detected by detector 25. This is known as a PRESYNC (pre-synchronization) state. If, after a predetermined time period, in this case 125 microseconds (μs), a second frameword is not detected or a second frameword with the same state is not detected, state machine 26 moves to out-of-frame (HUNT) state 44. In HUNT state 44, state machine 26 searches for a new frameword. In accordance with SONET/SDH standards, two consecutive framewords (partial or full detection)

with the same phase are detected before going into the locked-in-frame (SYNC synchronization) state 45.

Following a HUNT state 44, a PRESYNC state 42 may be achieved, in which case a first frameword is detected and the content and phase of the frameword are stored. If a second frameword is detected with the same content and phase as the first frameword after a predetermined time, e.g., 125 µs (during which time one or more intervening framewords may be ignored), state machine 26 goes into SYNC state 45. At transition from the HUNT state to SYNC state 45, state machine 26 provides an indication 47 (FIG. 2) to word rotator 27 in order to realign data words to the byte and frame boundaries.

Word rotator 27 aligns data in subsequent frames, based on the phase determined by detector 25 and state machine 26, to make starts of the subsequent frames coincide with a start of a data word and byte boundary. Rotating the framewords in this manner changes the phase of the framewords, thereby completing the data recovery at the framer. For example, referring to FIG. 4, the data shown there may be rotated accordingly to realign the word and byte boundaries.

In this embodiment, word rotator 27 is a parallel bit rotator that uses the phase (e.g., the MSB bit position of each 8-bit block) to move bits to achieve a desired phase. Stated mathematically, the bits are rotated as follows:

If PHASE i={1.7} then
    Dataout(7:0) W(t)(i-1:0) & W(t-1)(7:i)

If PHASE 8/0 then
    Dataout(7:0)=W(t)(8:1), where "Dataout" is the rotated data word, "i" is an integer, W(t)(x:y) is the content of a register 30a to 30g from bit "x" to bit "y", W(t) is the current register (e.g., 30b in FIG. 3) and W(t-1) is the register before the current register (e.g., 30a in FIG. 3). The output of word rotator 27 is provided to Section/Line Termination and Overhead Extraction circuit 49 (or simply "extraction circuit 49").

Extraction circuit 49 receives rotated data words 50 from word rotator 27 and a timing signal 51, from time base circuit 52, that is based on the frame synchronization signal 54 from state machine 26. Extraction circuit 49 searches for and extracts the framing and overhead bytes from the frames and outputs 55 the remainder.

The foregoing describes performing frameword and phase detection on an 8-bit parallel data stream. The invention, however, is not limited to use with an 8-bit parallel data stream. For data streams with wider parallel data paths (e.g., 128 bit parallel data versus 16 bit parallel data), the data may be divided into 8-bit blocks (or slices) and the start of a frame and the phase of the frame may be identified in one of the resulting blocks. Block sizes other than 8-bit blocks may also be used.

Figure 6A:
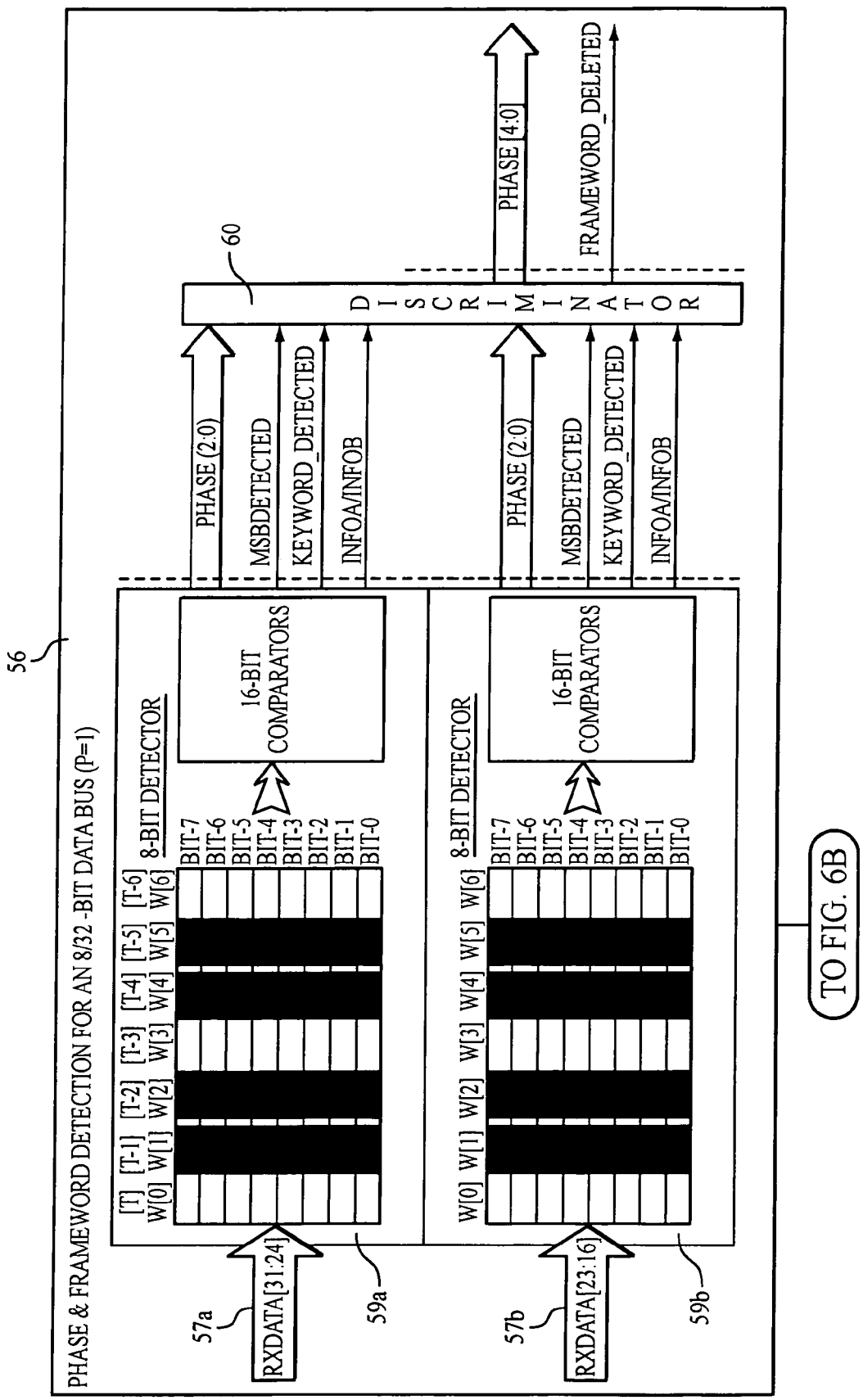
FIG. 6 is a block diagram of an alternate embodiment of the phase and frameword detector shown in FIG. 3.
Figure 6B:
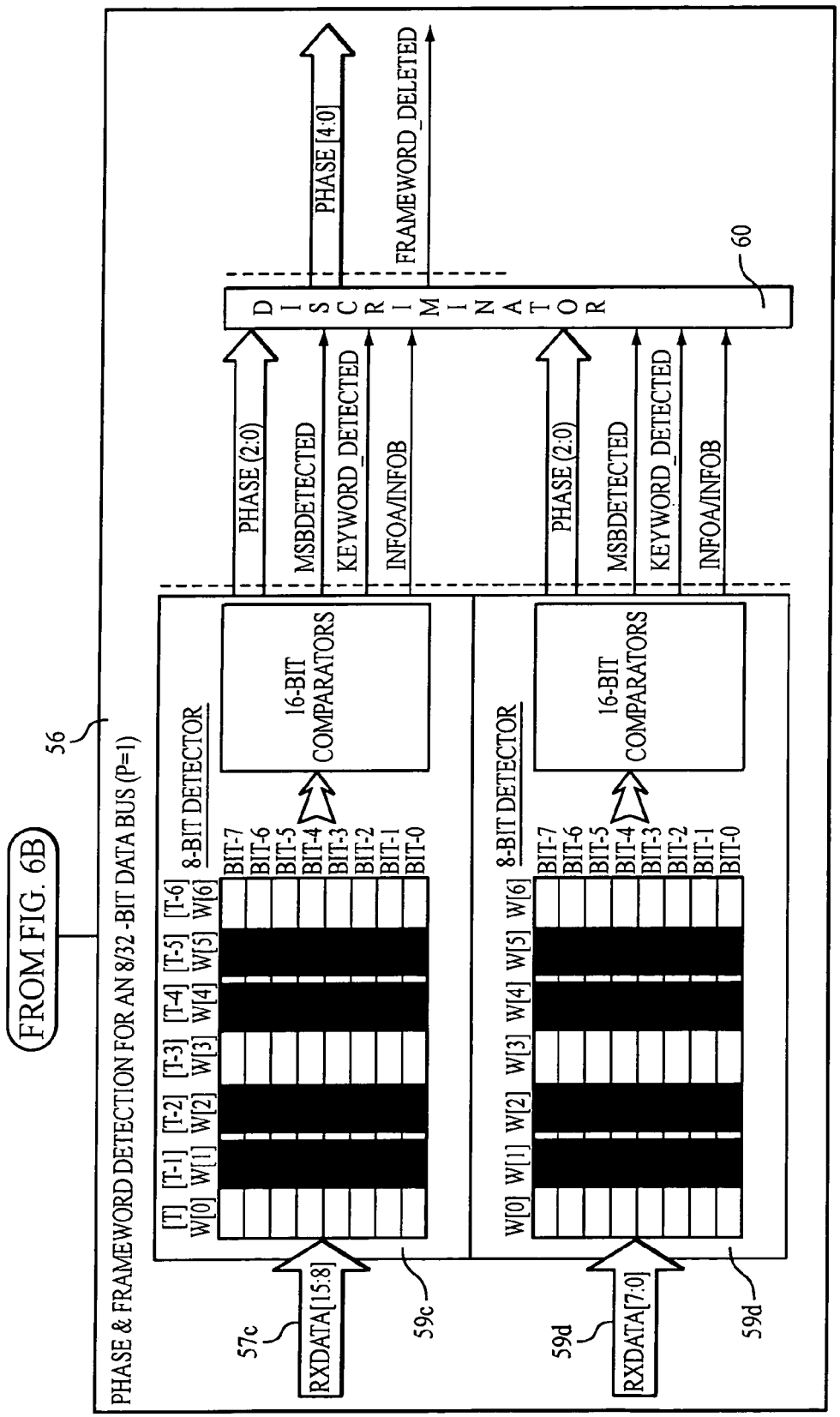

FIG. 6 shows an example of a detector 56 that may be used in framer 16 (in lieu of 8-bit detector 25) to process a 32-bit parallel data stream. In this example, circuitry (not shown) divides each 32-bit parallel data word into four blocks 57a to 57d, each having 8 bits. Each block 57a to 57d can then be processed using an 8-bit detector 59a to 59d, respectively, as in the 8-bit example described above.

In more detail, each of the four detectors 59a to 59d processes a specific 8-bit block of the 32-bit parallel data (for 8-bit processing only, three of the detectors may be disabled) Each detector 59a to 59d is identical to detector 25 described above. In this example, detector 59a may be used to process bits (31:24) of the 32-bit parallel data, detector 59b may be used to process bits (23:16), detector 59c may be used to process bits (15:8), and detector 59d may be used to process bits (7:0). The phase output of each detector is sent to discriminator 60, which will check for coherency between the four phase outputs and which will determine the final phase out of the 32 possible word phases (since there are 32 bits, there are 32 possible phases).

In 32-bit mode, the combined four detectors 59a to 59d are able to detect the $12 \times F6_H - 12 \times 28_H$ framing pattern (A1(N-11), A1(N-10) . . . A1(N-1), A1(N), A2(1), A2(2) . . . A2(11), A2(12)) and corresponding phase associated with a 32-bit word. Detector 59a uses first a 16-bit sliding comparator to determine if the data word MSB is present in the data that it is processing. This is performed in the same manner as in the 8-bit case. That is, detector 59a detects the $F6_H - 28_H$ frameword bytes out of the W(0), W(3) and W(6) words, i.e., out of A1(N-11), A1(N), A2(1) and A2)12). This process will indicate whether the MSB of the 32-bit word is present in the 8-bit block (basically, the first framing bit), as well as its position in the 8-bit block. Stated mathematically, the MSB is detected as follows $$\text{PHASE } i = \{1:7\} \text{ if } F6\text{-}F28 \ (HEX)$$
$$= A1(N-11)\{7:i\} \ \& \ A1(N)\{i-1:0\} \ \&$$
$$A2(0)\{7:i\} \ \& \ A2(12)\{i-1:0\}$$
$$= W(6)\{i-1:0\} \ \& \ W(3)\{7:0\} \ \&$$
$$W(0)\{7:i\}$$

$$\text{PHASE } 8 \text{ or } 0 \text{ if } F6\text{-}F28 \ (HEX) = A1(N)\{7:0\} \ \& \ A2(12)\{7:0\}$$
$$= W(6)\{7:0\} \ \& \ W(3)\{7:0\}$$

If the MSB (the first framing bit) is not present in the 8-bit block processed by detector 59a, i.e., the sliding comparator does not find a match, then two other fixed comparisons may be used to determine if the block contains the frameword bytes.

The data may instead comprise payload bits. Alternatively, if the data includes framing bits without the MSB, the data is referred to herein as "INFOa" and "INFOb". The data is considered INFOa or INFOb if $$\text{PHASE } i = \{8:1\} \text{ and } W(6)\{7:0\} \ \& \ W(3)\{7:0\}$$
$$= VALUEi \text{ (from Table 1); or}$$
$$\text{PHASE } i = \{8:1\} \text{ and } W(3)\{7:0\} \ \& \ W(0)\{7:0\}$$
$$= VALUEi \text{ (from Table 1).}$$

As was the case in the 8-bit mode described above, each detector 59a to 59d can optionally check to determine if the rest of the data, i.e., the W(1), W(2), W(4) and W(5) words, matches the frameword and to determine the phase of that data. This is done using additional comparators, as described above. Mathematically, this comparison is written as follows $$\text{PHASE } i = \{1 \ldots 8\} \text{ if } W(4)\{7:0\} \ \& \ W(1)\{7:0\} =$$
$$W(5)\{7:0\} \ \& \ W(2)\{7:0\}$$
$$= VALUEi \text{ (of Table 1)}$$

Each detector will output the following information if a coherent phase is detected. The information includes an indication that at least a partial frameword has been detected, an indication as to whether the MSB of a frameword has been detected or not, INFOa or INFOb if the MSB has not been detected, and/or an 8-bit block having PHASE i={1.8} to account for the eight possible phases per block.

Discriminator 60 receives the foregoing information from the four detectors 59a to 59d and resolves the phase and frameword detection. That is, discriminator 60 takes the partial information received from each detector and analyzes that information to determine the phase and frameword location for the entire 32-bit block of parallel data. Discriminator 60 resolves the phase and frameword detection using either full detection (Table 2) or partial detection (Table 3).

TABLE 2

Full Detection, 24 Framing Bytes

| DETECTOR 59a | DETECTOR 59b | DETECTOR 59c | DETECTOR 59d | CONCLUSION |
|---|---|---|---|---|
| PHASEi MSB | PHASEi Not MSB INFOb | PHASEi Not MSB INFOb | PHASEi Not MSB INFOb | Phase = { 24 + Phasei } Frameword Detected |
| PHASEi Not MSB INFOa | PHASEi MSB | PHASEi Not MSB INFOb | PHASEi Not MSB INFOb | Phase = { 16 + Phasei } Frameword Detected |
| PHASEi Not MSB INFOa | PHASEi Not MSB INFOa | PHASEi MSB | PHASEi Not MSB INFOb | Phase = { 8 + PHASEi } Frameword Detected |
| PHASEi Not MSB INFOa | PHASEi Not MSB INFOa | PHASEi Not MSB INFOa | PHASEi MSB | Phase = { PHASEi } Frameword Detected |
| PHASE8 | PHASE8 | PHASE8 | PHASE8 | Phase = 32 Frameword Detected |
| ANY OTHER COMBINATION | ANY OTHER COMBINATION | ANY OTHER COMBINATION | ANY OTHER COMBINATION | INVALID PHASE AND FRAMEWORD NOT DETECTED |

TABLE 3

Partial Detection on 48 Framing Bits

| DETECTOR 59a | DETECTOR 59b | DETECTOR 59c | DETECTOR 59d | CONCLUSION |
|---|---|---|---|---|
| PHASEi MSB (disabled optional comparators) | PHASEi INFOb (disabled optional comparators) |  | PHASEi INFOb (disabled optional comparators) | Phase = { 24 + Phasei } Frameword Detected |
| PHASEi INFOa (disabled optional comparators) | PHASEi MSB (disabled optional comparators) | PHASEi INFOb (disabled optional comparators) |  | Phase = { 16 + Phasei } Frameword Detected |
|  | PHASEi INFOa (disabled optional comparators) | PHASEi MSB (disabled optional comparators) | PHASEi INFOb (disabled optional comparators) | Phase = { 8 + PHASEi } Frameword Detected |
| PHASEi INFOa (disabled optional comparators) |  | PHASEi INFOa (disabled optional comparators) | PHASEi MSB (disabled optional comparators) | Phase = { PHASEi } Frameword Detected |
| PHASE8 | PHASE8 | PHASE8 | PHASE8 | Phase = 32 |

TABLE 3-continued

Partial Detection on 48 Framing Bits

| DETECTOR 59a | DETECTOR 59b | DETECTOR 59c | DETECTOR 59d | CONCLUSION |
|---|---|---|---|---|
| (disabled optional comparators) | (disabled optional comparators) | (disabled optional comparators) | (disabled optional comparators) | Frameword Detected |
| ANY OTHER COMBINATION | ANY OTHER COMBINATION | ANY OTHER COMBINATION | ANY OTHER COMBINATION | INVALID PHASE AND FRAMEWORD NOT DETECTED |

Table 1 shows the case where all detectors are enabled and Table 2 shows the case where only some detectors are enabled. To "disable" a detector, the detector may be disabled physically or its outputs may be suppressed or not accepted by the discriminator.

In more detail, discriminator 60 arrives at its conclusion (the "conclusion" column of Tables 2 and 3) based on the outputs of the detectors, shown in the "detectors" columns of Tables 2 and 3. For example, if detector 59a outputs a PHASEi and MSB; detector 59b outputs a PHASEi, not MSB, and INFOb; detector 59c outputs a PHASEi, not MSB, and INFOb; and detector 59d outputs a PHASEi, not MSB, and INFOb, discriminator 60 determines that the phase of the frameword is 24+PHASEi and that the frameword is detected.

The output of discriminator 60 would be provided to word rotator 27 and state machine 26 as in FIG. 2. State machine 26 operates in the same manner as described above. In this "32-bit" example, word rotator 27 would align the 32-bit output data to the frame boundary as follows If PHASE $i = \{1 \ldots 31\}$ then $Dataout\{31:0\}$
$$= W(t)(i-1:0) \ \& \ W(t-1)(32:i)$$

If PHASE 32 or 0 then Dataout{31:0} W(t){31:0}.

The foregoing describes 8-bit and 32-bit implementations of a data framer. Such a framer, however, can be extended to any data path using a 4P×8-bit (P>1) parallel bus for SONET/SDH word and frame alignment. In this case, 4×P detector blocks may operate in parallel. Each detector block processes an 8-bit block of data (8 consecutive bits) extracted from the 4P×8-bit parallel input receive bus.

Figure 7:
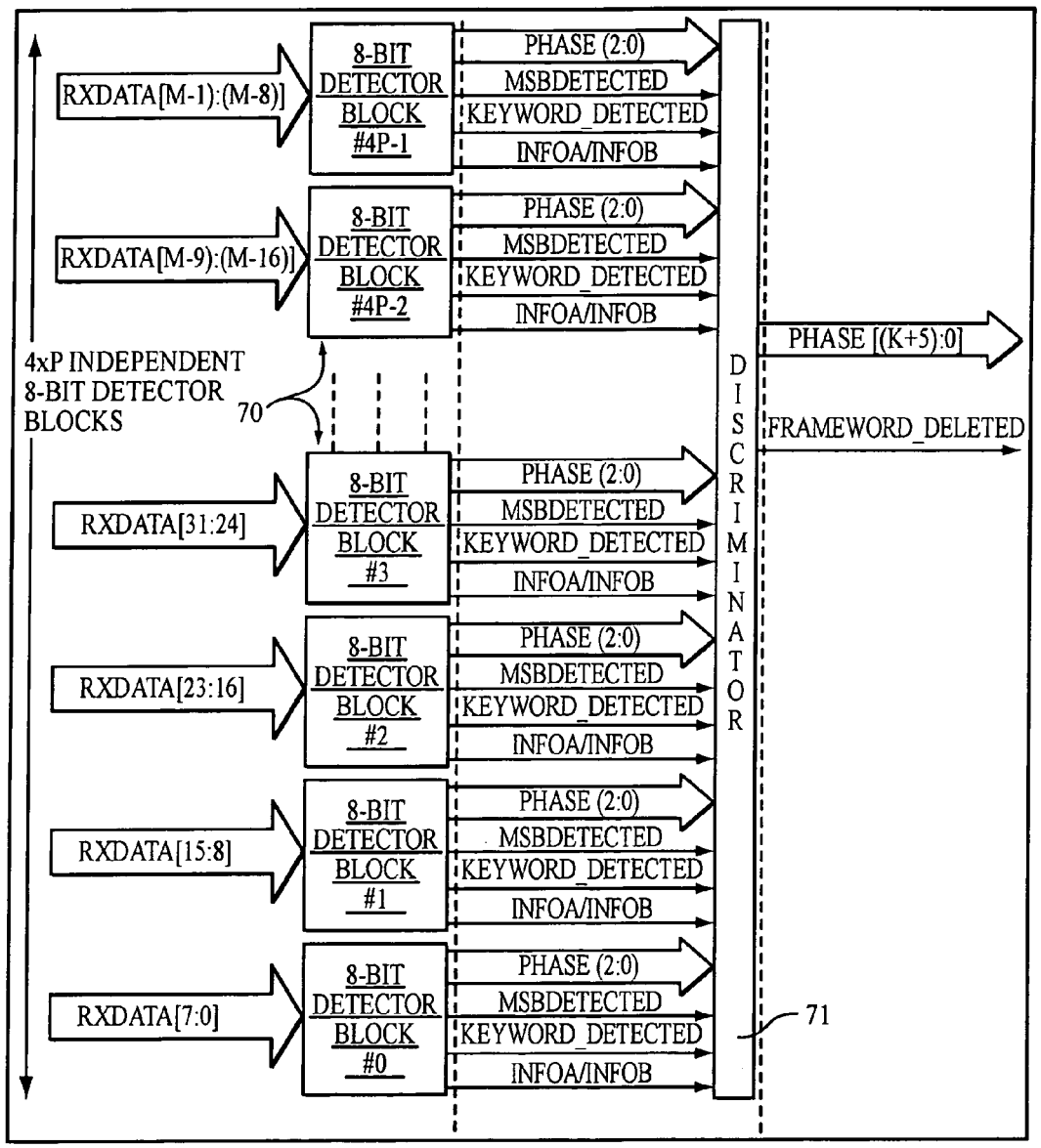
FIG. 7 is a block diagram of an alternate embodiment of the phase and frameword detector shown in FIG. 3

Referring to FIG. 7, the phase and frameword detectors 60 used in the 4P×8-bit implementation for each 8-bit data slice are identical to the ones described in the 8-bit and 32-bit examples shown above. The discriminator 71 receives the outputs of the detectors and, based on those outputs, identifies the MSB position of the 4P-byte (relative to the frame boundary) and detects the frameword. The word phase value (MSB position) will be between 1 and 4P.

In the 4P×8-bit implementation, the state machine is identical to the state machine described above. The word rotator may be modified to accommodate a wider data bus width, but is otherwise identical to that described above.

By way of example, for a 128-bit data path, the data framer would include 16 8-bit detector blocks operating in parallel, a discriminator, a counter, and a 128-bit word rotator. This same implementation can support a 32-bit and 8-bit data path by disabling appropriate detector blocks. As noted, the detector blocks may be "disabled" by programming the discriminator to ignore or not accept their outputs.

Among the advantages of the invention are the following. Byte/word and frame alignment may be performed at low rate using a parallel clock and data. This is independent of both the serial-to-parallel conversion performed at high-speed and the parallel-to-parallel conversion performed at the framer input. In the case of a transmission beyond repair with a high probability of a false frameword in the incoming parallel data, the data path and the framer time base may not be affected unless a different frame alignment is found. Basically, while the state machine is in "HUNT mode", the framer time base and word alignment are not modified until a new phase/frame alignment is determined.

The same circuitry can be re-used for 8-bit, 32-bit and 4P×8-bit implementations, since the comparisons for word/phase alignment are performed using simple 16-bit comparators. This lowers timing constraints. The framer may be pipelined, since the frameword/phase detection over a 32×P-bit data path may be broken into 4P independent 8-bit detector blocks. The framer is scaleable to any SONET/SDH framing and word alignment over a 32×P-bit parallel data path simply by increasing the number of 8-bit detector blocks. For word and phase alignment, the framer is less expensive in terms of the number of comparisons and load on data bits.

Although the data framers described herein are primarily hardware implementations, the processes implemented by the data framers may be implemented as machine-executable instructions that are executed by a processor out of a memory, such as a random access memory (RAM). The processes, however, are not limited to this; they may find applicability in any computing or processing environment.

The processes may be implemented in hardware, software, or a combination of the two. The processes may be implemented in computer programs executing on programmable machines that each includes a processor, a storage medium readable by the processor (including volatile and non-volatile memory and/or storage elements), at least one input device, and one or more output devices. Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform the process. The processes may be implemented as one or more articles of manufacture, such as a machine-readable storage medium, configured with a computer program, where, upon execution, instructions in the computer program cause the machine to operate in accordance with the process.

The invention is not limited to the embodiments described above. For example, the invention is not limited to use with SONET/SDH frames. Instead, it may be used with any suitable protocol that transfers data in frames. The invention is not limited to use with optical data transmission. The invention is not limited to the architectures described herein or to the order of processing in those architectures.

Other embodiments not described herein are also within the scope of the following claims.

What is claimed is:

1. A method of processing frames of data comprised of frameword bytes and a payload, comprising:
   receiving data for a first frame;
   storing the data for the first frame in N, N ≧2, registers;
   identifying a start of the first frame of data and a phase of the first frame concurrently based on the frameword bytes, wherein the phase of the first frame is identified based on a location of the start of the first frame in at least one of the N registers; and
   aligning data in a second frame of data, based on the phase of the first frame, to make a start of the second frame coincide with a start of a byte boundary.

2. The method of claim 1, wherein the frameword bytes identify the start of the first frame.

3. The method of claim 1, further comprising:
   locating the start of the first frame in the N registers.

4. The method of claim 3, wherein locating the start of the first frame comprises:
   comparing data for the first frame in the N registers to predetermined values for the frameword bytes.

5. The method of claim 1, wherein identifying the phase of the first frame comprises determining a location, in one of the N registers, of a first bit of data for a first frameword byte.

6. The method of claim 5, wherein aligning the data comprises shifting the first bit of data so that a first bit of data in the second frame is at a start of one of the N registers.

7. The method of claim 1, wherein the location of the start of the first frame in the N registers is identified based on whether a value stored in one of the N registers corresponds to a set of predefined values.

8. The method of claim 1, further comprising:
   dividing the data for the first and second frames into blocks;
   wherein the start of the first frame and the phase of the, first frame are identified in one of the blocks and aligning is performed on the second frame.

9. The method of claim 1, further comprising:
   identifying a predetermined number of frames following identifying the start of the first frame and the phase of the first frame;
   wherein aligning is performed on the second frame after identifying the predetermined number of frames.

10. The method of claim 1, wherein the start of the byte boundary comprises a start of a word boundary.

11. An apparatus for processing frames of data comprised of frameword bytes and a payload, comprising:
    a detector to identify a start of a first frame of data and a phase of the first frame concurrently based on the frameword bytes, the detector comprising N, N ≧2, registers to receive and to store the data for the first frame, the detector for identifying the phase of the first frame based on a location of the start of the first frame in at least one of the N registers; and
    a word rotator to align data in a second frame of data, based on the phase of the first frame, to make a start of the second frame coincide with a start of a byte boundary.

12. The apparatus of claim 11, wherein the frameword bytes identify the start of the first frame.

13. The apparatus of claim 11, wherein the detector is configured to locate the start of the first frame in the N registers.

14. The apparatus of claim 13, wherein the detector is configured to locate the start of the first frame by comparing data for the first frame in the N registers to predetermined values for the frameword bytes.

15. The apparatus of claim 11, wherein the detector is configured to identify the phase of the first frame by determining a location, in one of the N registers, of a first bit of data for a first frameword byte.

16. The apparatus of claim 15, wherein the word rotator is configured to align the data by shifting the first bit of data so that a first bit of data in the second frame is at a start of one of the N registers.

17. The apparatus of claim 11, wherein the detector is configured to identify the location of the start of the first frame in the N registers based on whether a value stored in one of the N registers corresponds to a set of predefined values.

18. The apparatus of claim 11, further comprising:
circuitry to divide the data for the first and second frames into blocks;
wherein the detector is configured to identify the start of the first frame and the phase of the first frame in one of the blocks and the word rotator is configured to perform aligning on the second frame.

19. The apparatus of claim 11, further comprising:
a state machine to identify a predetermined number of frames following identifying the start of the first frame and the phase of the first frame;
wherein the word rotator is configured to perform aligning on the second frame after the state machine identifies the predetermined number of frames.

20. The apparatus of claim 11, wherein the start of the byte boundary comprises a start of a word boundary.

21. A computer-readable medium that stores computer-executable instructions to process frames of data comprised of frameword bytes and a payload, the computer-executable instructions for causing a machine to:
receive data for a first frame;
store the data for the first frame in N, N ≥2, registers;
identify a start of a first frame of data and a phase of the first frame concurrently based on the frameword bytes, wherein the phase of the first frame is identified based on a location of the start of the first frame in at least one of the N registers; and
align data in a second frame of data, based on the phase of the first frame, to make a start of the second frame coincide with a start of a byte boundary.

22. The computer-readable medium of claim 21, wherein the frameword bytes identify the start of the first frame.

23. The computer-readable medium of claim 21, further comprising instructions that cause the machine to:
locate the start of the first frame in the N registers.

24. The computer-readable medium of claim 23, wherein locating the start of the first frame comprises:
comparing data for the first frame in the N registers to predetermined values for the frameword bytes.

25. The computer-readable medium of claim 21, wherein identifying the phase of the first frame comprises determining a location, in one of the N registers, of a first bit of data for a first frameword byte.

26. The computer-readable medium of claim 25, wherein aligning the data comprises shifting the first bit of data so that a first bit of data in the second frame is at a start of one of the N registers.

27. The computer-readable medium of claim 21, wherein the location of the start of the first frame in the N registers is identified based on whether a value stored in one of the N registers corresponds to a set of predefined values.

28. The computer-readable medium of claim 21, further comprising instructions that cause the machine to:
divide the data for the first and second frames into blocks;
wherein the start of the first frame and the phase of the first frame arc identified in one of the blocks and aligning is performed on the second frame.

29. The computer-readable medium of claim 21, further comprising instructions that cause the machine to:
identify a predetermined number of frames following identifying the start of the first frame and the phase of the first frame;
wherein aligning is performed on the second frame after identifying the predetermined number of frames.

30. A method of processing frames of data, comprising receiving data for a first frame;
dividing the data for the first frame into blocks that are stored in registers;
using multiple comparators to analyze the blocks, each comparator analyzing at least two blocks that are non-consecutive in the first frame to determine a phase of the at least two blocks, where the phase corresponds to a location of the first frame in at least one register;
identifying a start of the first frame and a phase of the first frame based on the phases of the blocks determined by the multiple comparators; and
aligning data in a second frame of data, based on the phase of the first frame, to make a start of the second frame coincide with a start of a byte boundary.

31. The method of claim 30, wherein using multiple comparators to analyze the blocks comprises using multiple comparators to analyze the blocks in parallel.

32. The method of claim 30, wherein receiving data for a first frame comprises receiving data for the first frame through an N-byte parallel data path, N being equal to the a number of blocks, each block processing an 8-bit portion of the N-byte data path.

33. The method of claim 30, wherein the frames of data comply with at least one of Synchronous Optical Networking and Synchronous Digital Hierarchy standards.

34. An apparatus for processing frames of data, comprising:
groups of registers to store blocks of a first frame, each group of registers for storing blocks that are non-consecutive in the first frame;
a plurality of comparators to analyze the blocks of the first frame, each comparator for determining a phase of the blocks stored in one group of registers, where the phase corresponds to a location of the first frame in at least one register;
a detector to identify a start of the first frame and a phase of the first frame based on the phases of blocks determined by the plurality of comparators; and
a word rotator to align data in a second frame of data based on the phase of the first frame to make a start of the second frame coincide with a start of a byte boundary and a word boundary.

35. The apparatus of claim 34, wherein the plurality of comparators operate in parallel.

36. The apparatus of claim 34, wherein each block processes 8 consecutive bits of a parallel data path, each word is equal to N bytes, and the plurality of comparators comprise N comparators.

37. The apparatus of claim 34, wherein the frames of data comply with at least one of Synchronous Optical Networking and Synchronous Digital Hierarchy standards.

* * * * *